(12) United States Patent
Sharma et al.

(10) Patent No.: US 11,290,848 B2
(45) Date of Patent: Mar. 29, 2022

(54) ESTIMATE OF A LOCATION OF THE TERMINAL DEVICES

(71) Applicant: Sony Corporation, Tokyo (JP)

(72) Inventors: Vivek Sharma, Basingstoke (GB); Hideji Wakabayashi, Basingstoke (GB); Yuxin Wei, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 16/764,021

(22) PCT Filed: Nov. 15, 2018

(86) PCT No.: PCT/EP2018/081365
§ 371 (c)(1),
(2) Date: May 14, 2020

(87) PCT Pub. No.: WO2019/096901
PCT Pub. Date: May 23, 2019

(65) Prior Publication Data
US 2021/0368296 A1    Nov. 25, 2021

(30) Foreign Application Priority Data
Nov. 16, 2017   (EP) ..................................... 17202193

(51) Int. Cl.
*H04W 4/029* (2018.01)
*H04W 12/037* (2021.01)

(52) U.S. Cl.
CPC ......... *H04W 4/029* (2018.02); *H04W 12/037* (2021.01)

(58) Field of Classification Search
CPC ........................... H04W 4/029; H04W 12/037
See application file for complete search history.

(56) References Cited

U.S. PATENT DOCUMENTS

| | | | |
|---|---|---|---|
| 9,271,256 B2* | 2/2016 | Edge | H04W 12/10 |
| 9,699,758 B2* | 7/2017 | Edge | H04W 12/10 |

(Continued)

FOREIGN PATENT DOCUMENTS

| | | |
|---|---|---|
| CN | 102149070 A | 8/2011 |
| CN | 103765927 A | 4/2014 |

(Continued)

OTHER PUBLICATIONS

International Search Report and Written Opinion dated Mar. 1, 2019 for PCT/EP2018/081365 filed on Nov. 15, 2018, 10 pages.

(Continued)

*Primary Examiner* — Steven S Kelley
(74) *Attorney, Agent, or Firm* — Xsensus LLP

(57) ABSTRACT

The controller circuitry is configured to identify one of the plurality of different position assistance information for use by the terminal device to identify a position of the terminal device, and to estimate the position of the terminal device by combining the identified position assistance information with the radio signal received by the position detection receiver circuitry. The position assistance information is identified in accordance with a permission allocated to the terminal device. By providing system information which is unencrypted and other system information which is encrypted, conditional access to the position assistance information can be provided in which a lowest level of position assistance information can provide the least level of position estimation accuracy.

16 Claims, 6 Drawing Sheets

(56) References Cited

U.S. PATENT DOCUMENTS

| | | | | |
|---|---|---|---|---|
| 9,736,684 | B2* | 8/2017 | Venkatsuresh | H04W 12/02 |
| 2016/0029213 | A1* | 1/2016 | Rajadurai | H04W 12/06 |
| | | | | 380/283 |
| 2016/0380779 | A1* | 12/2016 | Sharma | H04L 12/189 |
| | | | | 370/312 |
| 2017/0034650 | A1* | 2/2017 | Shah | G01S 5/0252 |
| 2020/0383080 | A1* | 12/2020 | Sharma | H04W 12/037 |

FOREIGN PATENT DOCUMENTS

| | | |
|---|---|---|
| CN | 104620125 A | 5/2015 |
| CN | 107105403 A | 8/2017 |
| WO | 2013/033464 A2 | 3/2013 |
| WO | 2019/086309 A1 | 5/2019 |

OTHER PUBLICATIONS

Lu H. and Wu M., "An Supl-Based Location Platform Implementation in Mobile Network," Proceedings of ICCTA, 2009, pp. 284-287.

5G, "The Mobile Broadband Standard," 3GPP Specification Series, 36, 6 pages.

5G, "The Mobile Broadband Standard," 3GPP Specification Series, 38, 3 pages.

3GPP, "LTE; Evolved Universal Terrestrial Radio Access Network (E-UTRAN); Stage 2 functional specification of User Equipment (UE) positioning in E-UTRAN," TS 36.305, Version 10.0.0, Release 10, Jan. 2011, pp. 1-52.

3GPP, "LTE; Digital cellular telecommunications system (Phase 2+); Universal Mobile Telecommunications System (UMTS); Functional stage 2 description of Location Services (LCS)," TS 23.271, Version 10.4.0, Release 10, Apr. 2013, pp. 1-170.

3GPP, "LTE; Evolved Universal Terrestrial Radio Access (E-UTRA); LTE Positioning Protocol (LPP)," TS 36.355 Version 14.2.0, Release 14, Jul. 2017, pp. 1-169.

RAN2, "LS on encrypting broadcasted positioning data," 3GPP TSG-RAN WG2 Meeting #99Bis, R2-1712031, Prague, Czech Republic, Oct. 9-13, 2017, 1 page.

\* cited by examiner

ESTIMATE OF A LOCATION OF THE TERMINAL DEVICES

CROSS-REFERENCE TO RELATED APPLICATIONS

The present application is based on PCT filing PCT/EP2018/081365, filed Nov. 15, 2018, which claims priority to EP 17202193.3, filed Nov. 16, 2017, the entire contents of each are incorporated herein by reference.

BACKGROUND

Field of the Disclosure

The present technique relates to terminal devices which are configured to generate an estimate of a location of the terminal devices. The present technique also relates to infrastructure equipment and methods, which are configured to provide position assistance information which is used by communications terminals to generate an estimate of their location.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Third and fourth generation mobile telecommunication systems, such as those based on the 3GPP ($3^{rd}$ Generation Partnership Project) defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things" (IoT), and may typically be associated with the transmissions of relatively small amounts of data with relatively high latency tolerance. Low complexity devices are also often low power devices, in which it is desirable for such devices to have a low power consumption (and therefore a long battery life).

Future wireless communications networks will be expected to routinely and efficiently support location based services with a wider range of devices/applications than current systems are optimised to support.

For example, it is expected that wireless communications in 5G will support geo-fencing services such as child location services, mobile coupons/advertisements which are triggered near a shop and airport automatic check-in at the gate/counter. These applications require continuous tracking of UE position or monitoring the equivalent trigger conditions with low UE power consumption.

In view of this there is expected to be a desire for future wireless communications networks, for example those which may be referred to as 5G ($5^{th}$ Generation) or new radio (NR) system/new radio access technology (RAT) systems, as well as future iterations/releases of existing systems, to efficiently support connectivity for a wide range of devices. In particular, the problem of how to efficiently transmit signals to and receive signals from low complexity devices whilst keeping the power consumption of such devices low needs to be addressed.

SUMMARY

The present technique is defined according to the claims. According to an example embodiment of the present technique a terminal device is configured to receive one or more radio signals from which measurements can be used to assist in determining a position of the terminal device, and to detect one or more system information blocks carrying a plurality of different position assistance information transmitted from the infrastructure equipment. Each of the plurality of different position assistance information provides information which can be used to assist in determining the position of terminal device with a different level of accuracy, and one or more of the plurality of the different assistance information are encrypted, and one of the plurality of different position assistance information is unencrypted, the unencrypted position assistance information providing position assistance information for determining the position of the terminal device with the least accuracy compared with the one or more others of the plurality of different position assistance information. The terminal device is configured to identify one of the plurality of different position assistance information for use by the terminal device to identify a position of the terminal device, and to estimate the position of the terminal device by combining the identified position assistance information with the radio signal received by the position detection receiver circuitry. The position assistance information is identified in accordance with a permission allocated to the terminal device. By providing system information which is unencrypted and other system information which is encrypted, conditional access to the position assistance information can be provided in which a lowest level of position assistance information can provide the least level of position estimation accuracy.

Embodiments of the present technique can provide an arrangement in which different position assistance information is communicated to terminals devices efficiently and conveniently using system information blocks, which are broadcast from infrastructure equipment of a wireless communications network. Terminals devices are provided with conditional access to the different position assistance information, each of which can be used to detect a location of the terminals device with a different level of accuracy. The conditional access is provided by using encryption (ciphering). By using system information blocks to transmit a plurality of different position assistance information, the terminal devices are able to detect the position assistance information to which they have conditional access whether the terminal device is in the idle mode, inactive mode active mode in which the terminal device has a packet data context for transmitting and/or receiving data from the wireless communications network.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

As mentioned above the embodiments of the present invention can find application with advanced wireless communications systems such as those referred to as LTE, 5G or New Radio Access Technology (NR). New Radio Access Technology has been proposed in [2] to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered can include:
  Enhanced Mobile Broadband (eMBB)
  Massive Machine Type Communications (mMTC)
  Ultra Reliable & Low Latency Communications (URLLC)

Figure 1:
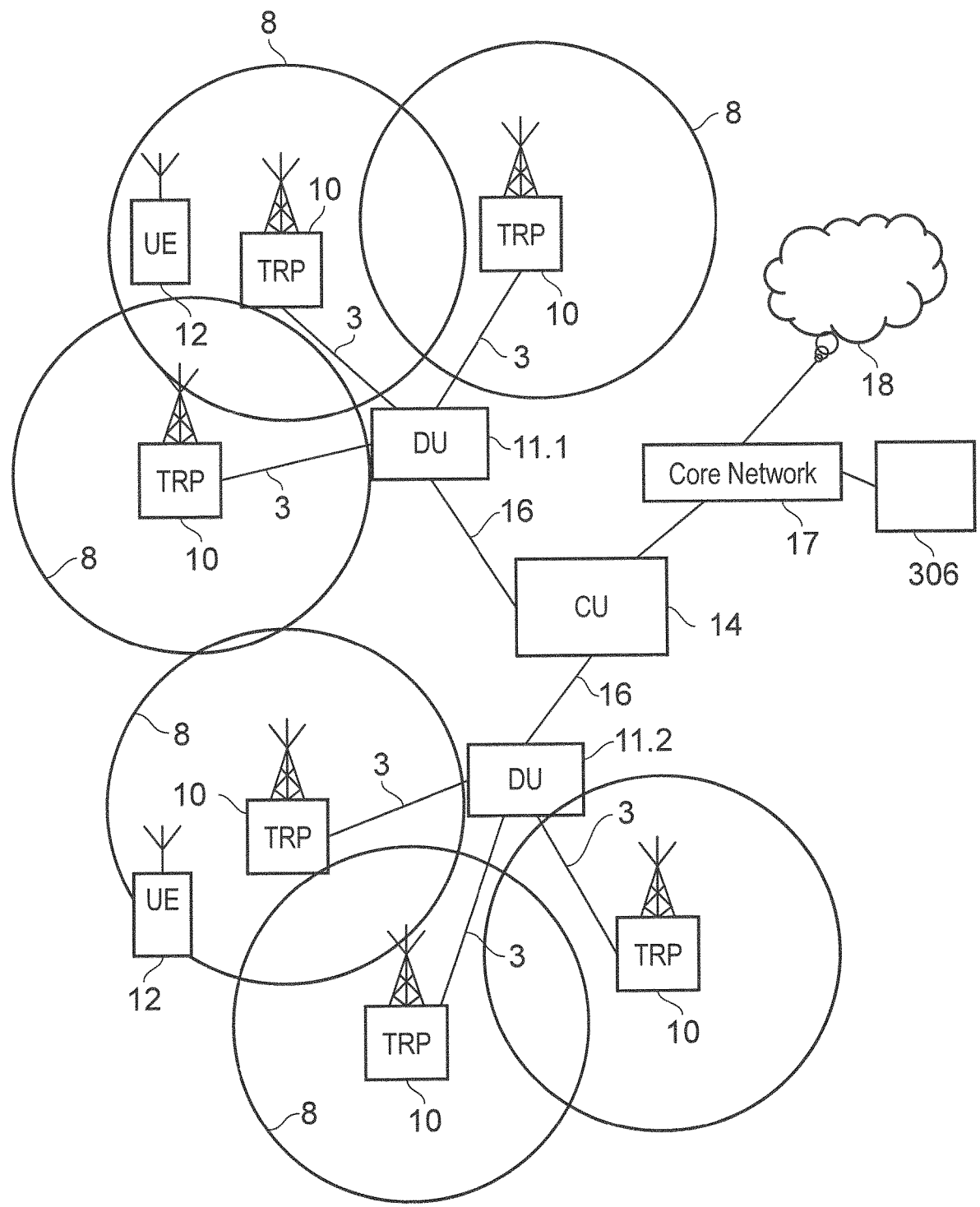
FIG. 1 is a schematic block diagram illustrating some basic functionality of a wireless communications system according to a 3GPP standard.

The aim of 5G is not only mobile connectivity for people, but to provide ubiquitous connectivity for any type of device and any type of application that would benefit from being connected. Many requirements and use-cases are still being discussed, but amongst those are:
  Low latency
  High data rates
  Millimetre wave spectrum use
  High density of network nodes (e.g. small cell and relay nodes)
  Large system capacity
  Large numbers of devices (e.g. MTC devices/Internet of Things devices)
  High reliability (e.g. for vehicle safety applications, such as self-driving cars).
  Low device cost and energy consumption
  Flexible spectrum usage
  Flexible mobility An example configuration of a wireless communications network which uses some of the terminology proposed for NR and 5G is shown in FIG. 1. In FIG. 1 a plurality of transmission and reception points (TRP) 10 are connected to distributed control units (DU) 11.1, 11.2 by a connection interface represented as a line 3. Each of the transmitter receiver points (TRP) 10 is arranged to transmit and receive signals via a wireless access interface within a radio frequency bandwidth available to the wireless communications network. Thus within a range for performing radio communications via the wireless access interface, each of the TRP 10, forms a cell of the wireless communications network as represented by a dashed line 8. As such wireless communications devices 12 which are within a radio communications range provided by the cells 10 can transmit and receive signals to and from the TRP 10 via the wireless access interface. Each of the distributed control units 11.1, 11.2 are connected to a coordinating unit (CU) 14 via an interface 16. The CU 14 is then connected to the a core network 17 which may contain all other functions required for communicating data to and from the wireless communications devices and the core network 17 may be connected to other networks 18.

The elements of the wireless access network shown in FIG. 1 may operate in a similar way to corresponding elements of an LTE network well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The transceiver processors TRP 10 of FIG. 1 may in part have a corresponding functionality to a base station or eNodeB of an LTE network, and so the terms TRP and eNodeB in the following description are interchangeable. Base stations, which are an example of radio network infrastructure equipment, may also be referred to as transceiver stations/NodeBs/eNodeBs (eNBs), and so forth. Similarly the communications devices 12 may have a functionality corresponding to devices know for operation with an LTE network and may also be referred to as mobile stations, user equipment (UE), user terminal, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

As shown in FIG. 1, attached to the core network 1 is a location server 306. Embodiments of the present technique for application in navigation or location based services, which require that a UE generate an estimate of its geographic location. As will be explained with reference to FIG. 2, it is known to provide a location server to generate position assistance information which assists the UE to identify its location in combination with other measurements generated from received radio signals.

Compared to existing solutions for positioning (such as those proposed by 3GPP) it is desirable to provide improved positioning arrangements. The term "positioning" should be understood to refer to any process by which a UE determines its position in space (in particular, its geographical position). The desired improvements include:
Variety of supported positioning methods/sensors
  Multiple GNSS satellites support
  Multiple indoor positioning sensors support
Higher position accuracy required
  Use high accuracy positioning with combination of GNSS (e.g. GLONASS (Globalnaya Navigazionnaya Sputnikovaya Sistema), Galileo, QZSS (Quasi-Zenith Satellite System))
  Hybrid operation with multiple sensors
  Outdoor/indoor seamless operation
Low power consumption
  Idle mode/inactive mode positioning/measurement
  No connected mode for getting assistance information
Large volume of positioning assistance information
  The number of supported GNSS is increased.
    To support network RTK (Real Time Kinematic), Precise Point Positioning (PPP)-RTK.
  NR PHY (Physical)/Protocol new functions
    Introduction of on-demand system information (SI)
    Inactive mode operation in addition to idle mode, connected mode The following embodiments relate primarily to 5G (NR) positioning enhancements. However, it will be appreciate that the teachings provided may be applicable for LTE systems (e.g. LTE systems which support on-demand SI or similar, as may be available in the near future). The present technique may provide at least some of the above-mentioned improvements for both suitable LTE and NR systems.

An example of on-demand SI which may be used with embodiments of the present technique may be found in European patent application EP 16180858.9, for example.

Furthermore, information regarding existing 3GPP location based service and protocols may be found in the following white paper: LTE Location Based Services Technology Introduction (Rohde & Schwarz) http://www.rohde-schwarz-wireless.com/documents/LTELBSWhitePaper-_RohdeSchwarz.pdf, the contents of which are incorporated herein by reference.

Supported versions of UE positioning methods in LPP are disclosed in 3GPP TS36.305, for example, the contents of which are incorporated herein by reference.

In 3GPP, when a UE determines its spatial position, the measurement of signals (from GNSS satellites or the like) and the calculation of the UEs position based on those signals are distinguished. "UE-assistance positioning" refers to a situation in which a device external to the UE (such as a location server of a network to which the UE is connected) calculates the position of the UE according to the report of measurement results from the UE. The present technique, on the other hand, allows more "UE-based positioning", in which the UE is provided with sufficient information to calculate its position. In other words (as described in 3GPP TS 36.305 V13.0.0 (2015-12)), the suffixes "-based" and "-assisted" refer respectively to the node that is responsible for making the positioning calculation (and which may also provide measurements) and a node that provides measurements (but which does not make the positioning calculation). Thus, an operation in which measurements are provided by the UE to the E-SMLC (Evolved Serving Mobile Location Centre) to be used in the computation of a position estimate is described as "UE-assisted" (and could also be called "E-SMLC-based"), while one in which the UE computes its own position is described as "UE-based". UE-based positioning (as used with the present technique) requires less communication with the network compared to UE-assistance positioning, thus reducing the power consumption at the UE.

As previously mentioned, UE positioning may be carried out based on signals received from GNSS satellites. As discussed in https://www.izsa.europa.eu/system/files/reports/gnss_mr_2017.pdf, for example, Global Navigation Satellite System (GNSS) is the infrastructure that allows users with a compatible device (in this case, UE) to determine their position, velocity and time by processing signals from satellites. GNSS signals are provided by a variety of satellite positioning systems, including global and regional constellations and Satellite-Based Augmentation Systems:
  Global constellations: Global Positioning System (GPS) (USA), Globalnaya Navigazionnaya Sputnikovaya Sistema (GLONASS) (Russian Federation), Galileo (EU), BeiDou (PRC).
  Regional constellations: Quasi-Zenith Satellite System (QZSS) (Japan), Indian Regional Navigation Satellite System (IRNSS) (India), and BeiDou regional component (PRC).
  Satellite-Based Augmentation Systems (SBAS): Wide Area Augmentation System (WAAS) (USA), European Geostationary Navigation Overlay Service (EGNOS) (EU), MTSAT Satellite Augmentation System (MSAS) (Japan), GPS Aided GEO Augmented Navigation (GAGAN) (India), System for Differential Corrections and Monitoring (SDCM) (Russian Federation) and Satellite Navigation Augmentation System (SNAS) (PRC).

A GNSS may have more than one band or code/signals. For example, GPS newly supports L2C signal (band L2, civilian GPS signal) in addition to conventional L1 C/A (band L1 and coarse/acquisition code). However, most of GPS terminals still support only L1 C/A.

GNSS assistance information via cellar network provides benefits for positioning. In particular, it allows some of the information required for the UE's position to be determined via GNSS to be provided to the UE via the network rather than directly from a satellite. In an embodiment of the present technique, GNSS assistance information may be transmitted to the UE in one or more system information blocks from the gNB 101 and received by the wireless communications receiver 202 of the UE 104. Other GNSS information is received directly from a satellite as part of the first signal by the first receiver 200 of the UE 104.

GNSS satellites transmit two type of signals, the codes and messages. The code is orthogonal code such as pseudorandom noise or the like. The messages includes the satellite orbit information such as Ephemeris and Almanac (which are needed for position estimation). Information regarding the Ephemeris and Almanac is provided in 3GPP TS 36.305 V13.0.0 (2015-12), for example. Here, it is defined that Ephemeris and Clock Models assistance provides the GNSS receiver (in this case, the UE) with parameters to calculate the GNSS satellite position and clock offsets. The various GNSSs use different model parameters and formats, and all parameter formats as defined by the individual GNSSs are supported by the signaling. It is also defined that Almanac assistance provides the GNSS receiver with parameters to calculate the coarse (long-term) GNSS satellite position and clock offsets. The various GNSSs use different model parameters and formats, and all parameter formats as defined by the individual GNSSs are supported by the signaling.

LPP supports the communication of a portion of the GNSS information (e.g. the messages) from a location server to a UE via an LTE base station as a faster complement to the transmission of this information from GNSS satellites.

Assistance information for positioning from the cellular network (that is, from a base station of the network) helps alleviate various problems associated with GNSS positioning, including those relating to the sensitivity of messages transmitted by GNSS satellites, the time to first fix and the provision of precise positioning.

In particular, the use of a cellular network helps alleviate satellite signal strength issues. A GNSS satellite signal is very weak due to the long distance between the UE and the satellites. The UE may also miss the signal due to having a relatively small GNSS antenna. It is noted that GNSS codes (in particular, GPS codes) require a lower signal to noise ratio (SNR) than GNSS messages (in particular, GPS messages). Thus, a situation may arise in which a UE can receive the GNSS codes, but cannot receive the GNSS messages. Furthermore, even if a UE can receive the message with high SNR, measurement time, which is called the time to first fix (TTFF), may be an issue. For example, GPS transmits the messages with very low bit rate (e.g. 50 bits/second). If a UE is to receive all necessary messages from a scratch (both Almanac and Ephemeris), this will take 12.5 minutes. By contrast, the cellular network provides a much higher bitrate and the UE is able to receive all necessary messages over a time period of the order of seconds.

The volume of GNSS assistance information is expected to be increased in the near future because of envisaged requirements for more accurate positioning. For example, JAXA (Japan Aerospace Exploration Agency) provides MADOCA (Multi-GNSS Advanced Demonstration tool for Orbit and Clock Analysis) for QZSS users, which needs precise point position (PPP). The assistance information from MADOCA is not only included in QZSS orbit and clock information, but is also used in other GNSS systems. However, the capacity of QZSS satellite communication (L-band) is limited. Highly common information which many users need may therefore be transmitted from the satellite. However, the remaining assistance information could be transmitted via other communication methods like (such as via the internet—for example, see https://ssl.tksc.jaxa.jp/madoca/public/public_index_en.html).

The above embodiments primarily relate to handling GNSS assistance information. However, the present technique may also be applied to positioning using other types of signal emitting devices which emit signals detectable by the UE. Such alternative positioning may be used in indoor public spaces (such as shopping centres, art galleries, museums and the like) in which it is not possible to obtain a satellite signal of sufficient strength and/or quality. In this case, information indicative of the position of one or more signal emitting devices is used in conjunction with a UE's distance from each signal emitting device (as measured based on a first signal from each signal emitting device by the first receiver 200 of the UE 104, for example) in order to determine the UE's position within the building. In this case, assistance information (indicative of the position of each of the one or more indoor signal emitting devices) could be transmitted to a UE via the network. More generally, the present technique may be implemented using one or more satellite or non-satellite signal emitting devices located at respective predetermined positions within a predetermined space. Various additional sensors may also be used for UE positioning, as explained later on. More information concerning the configuration of a UE to received assistance information is disclosed in EP17199204 [7] the content of which are herein incorporated by reference.

In the context of 5G (NR) positioning, PVT estimation may not only use GNSS positioning (or, more generally, positioning based on one or more signal emitting devices, which may include GNSS satellites or indoor signal emitting devices), but also one or more other sensors of various types. Thus, in addition to or instead of the first receiver 200 being configured to receive a signal from one or more signal emitting devices, the first receiver 200 may also receive signals from one or more other sensors comprised as part of the UE 104. Such sensors may include accelerometers, gravimeters, barometer sensors, gyroscopic sensors or the like, and may be used in various ways in addition to or instead of GNSS or other emitted signals. The term "sensor" should be interpreted broadly as an element (implemented using circuitry, for example) configured to detect one or more characteristics on the basis of which a position of the UE (or at least one or more services applicable based on the position of the UE) may be determined. Various different types of sensor may be used in combination in order to carry out UE positioning.

As described above, it is expected future wireless communications networks will efficiently support communications with devices including reduced complexity devices or machine type communication (MTC) devices, which may be deployed for supporting the "The Internet of Things", and may typically be associated with the transmissions of relatively small amounts of data with relatively high latency tolerance.

Figure 2:
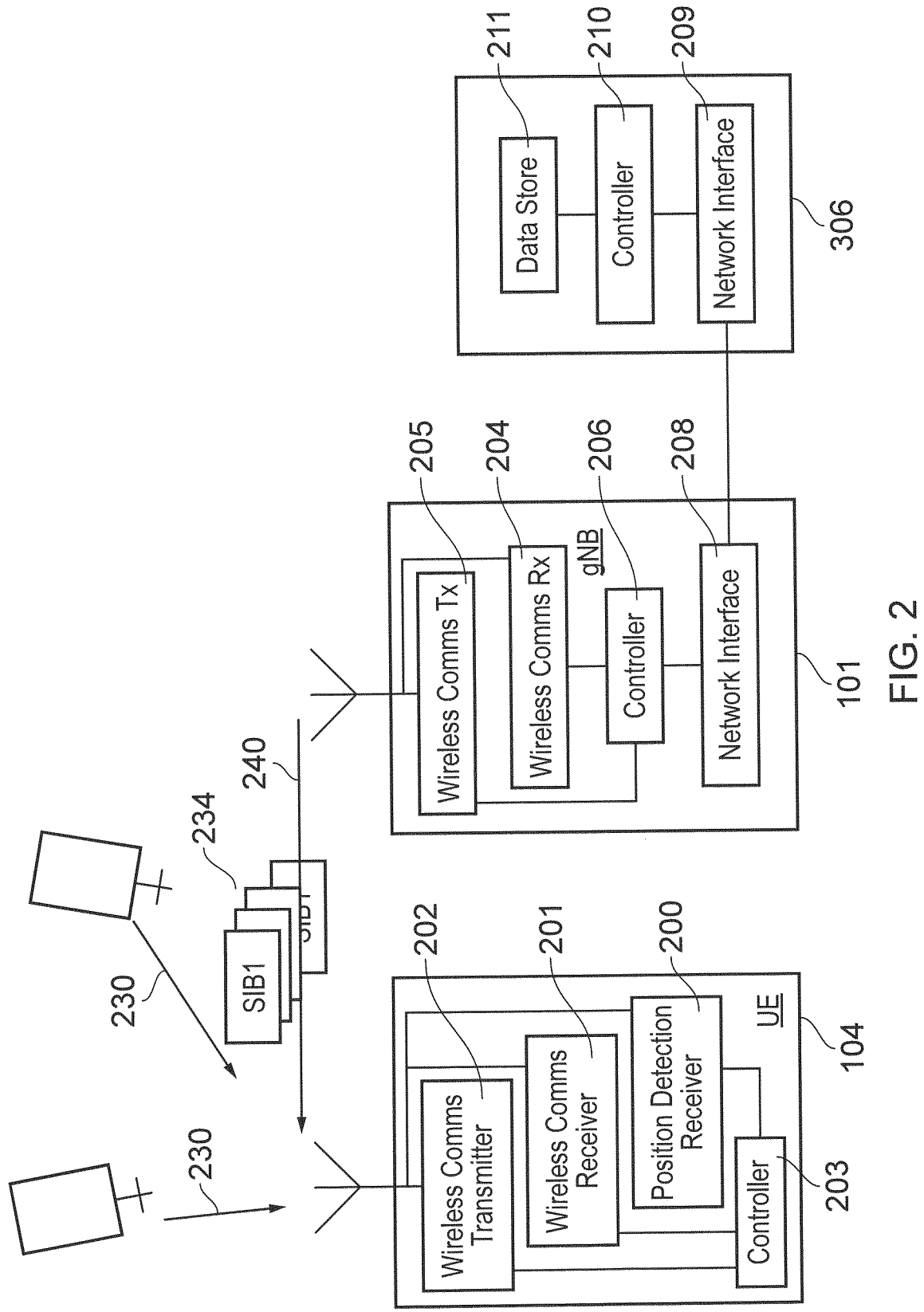
FIG. 2 is a schematic block diagram of a terminals device, an infrastructure equipment (gNodeB) and a location server which are configured to provide position assistance information to the terminal device for the terminal device to generate an estimate of its location according to an example embodiment of the present technique.

FIG. 2 schematically shows some components of a UE 104, a base station 101 and a data processing apparatus 306, which acts a location assistance server or SMLC according to an example embodiment of the present technique.

Embodiments of the present technique can provide an arrangement in which different items of position assistance information are communicated to terminal devices (UEs) in one or more system information blocks (SIBs) each different item providing a different level of assistance information to assist the UE to identify its location with a different level of accuracy. Furthermore as will be explained below in order to improve the integrity of the receipt of the information, a counter value may be used in each of a plurality of packets in which each different level of assistance information is carried to improve a likelihood of detecting an error in the integrity of the position assistance information which the one or more SIBs are carrying, or provide a facility for detecting a tampering or attack on the integrity of the positioning assistance information received by the UE.

In some embodiments, the different levels of position assistance information is provided in accordance with different subscription levels, by encrypting (ciphering) different position assistance information with different keys which may be carried in different SIBs. If, for example, there are five levels of positioning assistance information such that level one is free to all UEs and levels two to five are based on user's subscription then, in one example, levels two to five are encrypted with separate keys and broadcast in four different SIBs. In some embodiments level one provided in one of the SIBs (top-level SIB) indicates that the position assistance information provided in levels two to five are encrypted so that UEs without subscription do not waste power and drain their batteries trying to detect and to decode SIBs carrying levels two to five. Accordingly, other UEs with valid subscription are provided with an indication as to whether all levels are encrypted using the same key or different keys. This approach does not compromise security by informing if further SIBs are encrypted as it tells the status only but reduces trial and error mechanisms on the receiving side (UE). Therefore level one can be referred to as a top level SIB, which adapted to include an explicit indication of how the following SIBs are encrypted. This can include for examples that:
1. The following SIBs containing position assistance information are not encrypted;
2. The position assistance information in the following SIBs are encrypted using the same key;
3. The position assistance information in the following SIBs are encrypted using the same key different keys.

As shown in FIG. 2, the UE 104 comprises a position detection receiver 200, a wireless communications receiver 201, a wireless communications transmitter 202 and a controller 203. The position detection receiver 200 is for receiving wireless signals from each of one or more signal emitting devices located at respective spatial locations. Such signal emitting devices may be GNSS (Global Navigation Satellite System) satellites, for example. The wireless communications receiver 201 is for reception of wireless signals (e.g. radio signals) carrying user data from the wireless communications network of which the gNB 101 forms part. The wireless communications transmitter 202 is for transmitting wireless signals (e.g. radio signals). The controller 203 is configured to control the position detection receiver 200, wireless communications receiver 201 and wireless communications transmitter 202 and to control the UE 104 to operate in accordance with embodiments of the present disclosure. The controller 203 may comprise various sub-units for providing functionality in accordance with embodiments of the present disclosure as explained further below. The wireless communications receiver, the wireless communications transmitter, the position detection receiver and the controller may be implemented as discrete hardware elements or as appropriately configured functions of the controller 203. The controller 203 may be suitably configured/programmed to provide the desired functionality described herein using conventional programming/configuration techniques for equipment in telecommunications systems. The position detection receiver 200, wireless communications receiver 201, the wireless communications transmitter 200 and the controller 201 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the UE 104 will in general comprise various other elements associated with its operating functionality, such as a user interface, battery, and the like. In the following embodiments, the position detection receiver 200, the wireless communications receiver 201, transmitter 202 and the controller 203 are implemented as circuitry.

It will be appreciated by those skilled in the art that, in arrangements of the present technique, the transceiver 202 of the communications device 104 may not always include a transmitter, for example in scenarios where the communications device 104 is a low-power wearable device.

The base station 101 comprises a transmitter 205, a receiver 204, a network interface 208 and a controller 206. The transmitter 205 is for transmission of wireless signals (e.g. radio signals), the receiver 204 is for reception of wireless signals (e.g. radio signals), a network interface 208 for transmission and reception of signals (e.g. to and from a location server, as explained below) over a network such as the internet and the controller 206 is configured to control the transmitter 205, receiver 204 and network interface 208 and to control the base station 101 to operate in accordance with embodiments of the present disclosure. The controller 206 may comprise various sub-units for providing functionality in accordance with embodiments of the present disclosure as explained further below. These sub-units may be implemented as discrete hardware elements or as appropriately configured functions of the controller 206. The controller 206 may be suitably configured/programmed to provide the desired functionality described herein using conventional programming/configuration techniques for equipment in telecommunications systems. The transmitter 205, receiver 204, network interface 208 and controller 206 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry. It will be appreciated that, although not shown, the base station 101 will in general comprise various other elements associated with its operating functionality. In the following embodiments, the transmitter 205, receiver 204, network interface 208 and controller 206 are implemented as circuitry.

The data processing apparatus forming the eSMLC 306 comprises a network interface 209, a storage medium 211 and a controller 210. The network interface 209 is for transmission and reception of signals (e.g. to and from infrastructure equipment, as explained below) over a network such as the internet. The storage medium 211 is for storage of digital data (and may take the form of a hard disk drive, solid state drive, tape drive or the like, for example). The controller 210 is configured to control the network interface 208 and storage medium 211 and to control the data processing apparatus 306 to operate in accordance with embodiments of the present disclosure. The controller 210 may comprise various sub-units for providing functionality in accordance with embodiments of the present disclosure as explained further below. These sub-units may be implemented as discrete hardware elements or as appropriately configured functions of the controller 210. The controller 210 may be suitably configured/programmed to provide the desired functionality described herein using conventional programming/configuration techniques for equipment in telecommunications systems. The network interface 209, storage medium 211 and controller 210 are schematically shown in FIG. 2 as separate elements for ease of representation. However, it will be appreciated that the functionality of these elements can be provided in various different ways, for example using a single suitably programmed computer, or suitably configured application-specific integrated circuit(s)/circuitry.

It will be appreciated that, although not shown, the eSMLC 306 will in general comprise various other elements associated with its operating functionality. In the following embodiments, the network interface 209 and controller 210 are implemented as circuitry.

Embodiments of the present technique can provide improvements in providing position or location based services to UEs in accordance with different levels of position assistance information. According to the example embodiment presented in FIG. 2, the position detection receiver 200 is configured to receive one or more radio signals 230 from each of one or more signal emitting devices located at respective spatial positions. The controller 203 is arranged with the wireless communications receiver 201 and if required the wireless communications transmitter 202 to detect one or more system information blocks 234 carrying a plurality of different position assistance information transmitted from the gNB 101. Each of the plurality of different position assistance information providing information which can be used to assist in determining a position of UE with a different level of accuracy. According to the present technique one or more of the plurality of the different assistance information, carried by the one or more SIB 234 are encrypted, so that some discrimination can be provided in respect of the access of the assistance information to different UEs and/or given conditional access to the assistance information. As such, the UE is configured to identify one of the position assistance information for use by the UE to identify a position of the terminal device. The controller 203 is then arranged to estimate the position of the terminal device by combining the identified position assistance information with the radio signal 230 received by the position detection receiver circuitry 200. As such the position assistance information is identified in accordance with a permission allocated to the terminal device.

The System information blocks (SIB) 234 are known to be used within 3GPP to provide system information to UEs operating in a wireless communications network. The SIBs are broadcast by the gNBs to the UEs within the network in known resource elements of the wireless access interface. Before a UE can use a cell provided by a base station, the terminal is expected to carry out a series of steps. According to a conventional arrangement for other 3GPP systems like LTE, a UE detects a cell and cell-ID using the Primary Synchronisation Signal (PSS) and Secondary Synchronisation Signal (SSS) to detect the cell, and then receives a Master System Information Block (MIB) from the Physical Broadcast Channel (PBCH) and further System Information Blocks (SIB) from the PDSCH. More specifically a UE would have to first achieve time and frequency synchronisation with the cell, typically using the legacy PSS and SSS emitted by the base station. Then, the terminal will decode the PBCH to acquire the MIB. The MIB contains amongst other things information for the terminal to acquire further System Information, namely SIB1 that is transmitted via the PDSCH. SIB1 contains scheduling information for acquiring the remaining System Information portions (other SIBs). According to example embodiments of the present technique the plurality of different position assistance information is carried in one or more of these remaining SIBs. More information about SIBs can be found in TS 36.331.

According to example embodiments of the present technique, the wireless communications network is configured to transmit the one or more different position assistance information to the UEs within the SIBs. According to the example embodiment shown in FIG. 2, the one or more different position assistance information provides an indication of the respective spatial positions of each of the one or more signal emitting devices 232 with a different level of accuracy.

In some examples, the receiver 204 in the base station 101 is configured to receive a request message from the UE 104 (not shown) after the UE 104 has detected one or more radio signals 230 transmitted from each of one or more signal emitting devices 232 located at respective spatial positions. The controller 206 in the base station 101 is configured, in response to the request message, to determine the respective spatial positions of each of the one or more signal emitting devices 232. The transmitter 205 is configured to transmit position assistance information indicating the respective spatial positions of each of the one or more signal emitting devices within a predetermined system information block (SIB).

In some embodiments, the controller 203 of the UE 104 is configured to determine the spatial position of the terminal device with respect to each of the one or more signal emitting devices based on a measurement of a characteristic (e.g. signal strength and/or quality) of the one or more radio signals 230 transmitted by each of the one or more signal emitting devices 233. The position assistance information indicates the respective spatial position of each of the one or more signal emitting devices 232. The controller 203 is then able to calculate the absolute position of the UE 104 in a given coordinate system based on the determined spatial position of the terminal device with respect to each of the one or more signal emitting devices and the respective spatial position of each of the one or more signal emitting devices (such calculation techniques are known in the art and will therefore not be discussed here).

Embodiments of the present technique can provide an efficient way of communicating the position assistance information to UEs via the SIBs. In some embodiments, the same SIB may contain position assistance information which is encrypted (ciphered) using different keys. According to this example, the position assistance information is ciphered first and then encoded and put inside a radio resource control (RRC) packet data unit (PDU) in the location server (SMLC). Accordingly, the RRC PDU contains ciphered text as bit string or octet container or transparent container. A UE can decode the RRC PDU first and then perform deciphering or decrypting of the position assistance information. According to some embodiments therefore deciphering can be done in a packet data convergence protocol (PDCP) sublayer if the location server 306 performed ciphering after the RRC PDU. As such, a PDCP entity may not be required in the location server (e-SMLC) and a PDCP entity in the eNB can be used to perform the ciphering/deciphering. Since encryption is performed in the location server (e-SMLC) then some sort of PDCP-like entity may also be present in location server (e-SMLC). According to this arrangement a PDCP entity on UE side can be reused to avoid an increase in UE complexity and implementing the same functionality at different protocol layers. The PDCP entity is therefore responsible for radio bearer ciphering and integrity, so that within the UE a PDCP entity can perform deciphering/decrypting of the position assistance information received in system information.

As will be appreciated, a detailed mechanism for encrypting or ciphering are not necessary for understanding embodiments of the present technique. Examples may be included in radio bearer security based on EAP-AKA procedure and SA3 may decide an encryption certificate or PMK based key generation for positioning information. For the example in which separates SIB carry the different levels of position assistance information then each SIB may use a different encryption key. However, in other examples a single SIB may be used to carry all of the plurality of different levels of position assistance information. For this example an exchange of RRC PDUs or containers may be made more than once between RRC and PDCP layers. As mentioned above, PDCP functionality in the UE is reused for decryption whereas from a protocol layer principle, decryption is performed in LPP layer. If PDCP is used in the UE for decryption then duplication of functionality can be avoided in the function. If a single SIB is received with different keys used for encryption then the LPP RRC layer will receive a complete PDU first and then pass it on to PDCP layer to decrypt. In case one SIB contains data encrypted with single key the PDCP layer can decrypt the whole packet and then send it to an upper LPP RRC layer.

As will be appreciated from the above explanation, the terms encrypting/decrypting and ciphering/deciphering should be understood as being interchangeable in the description of the disclosed embodiments.

Figure 3:
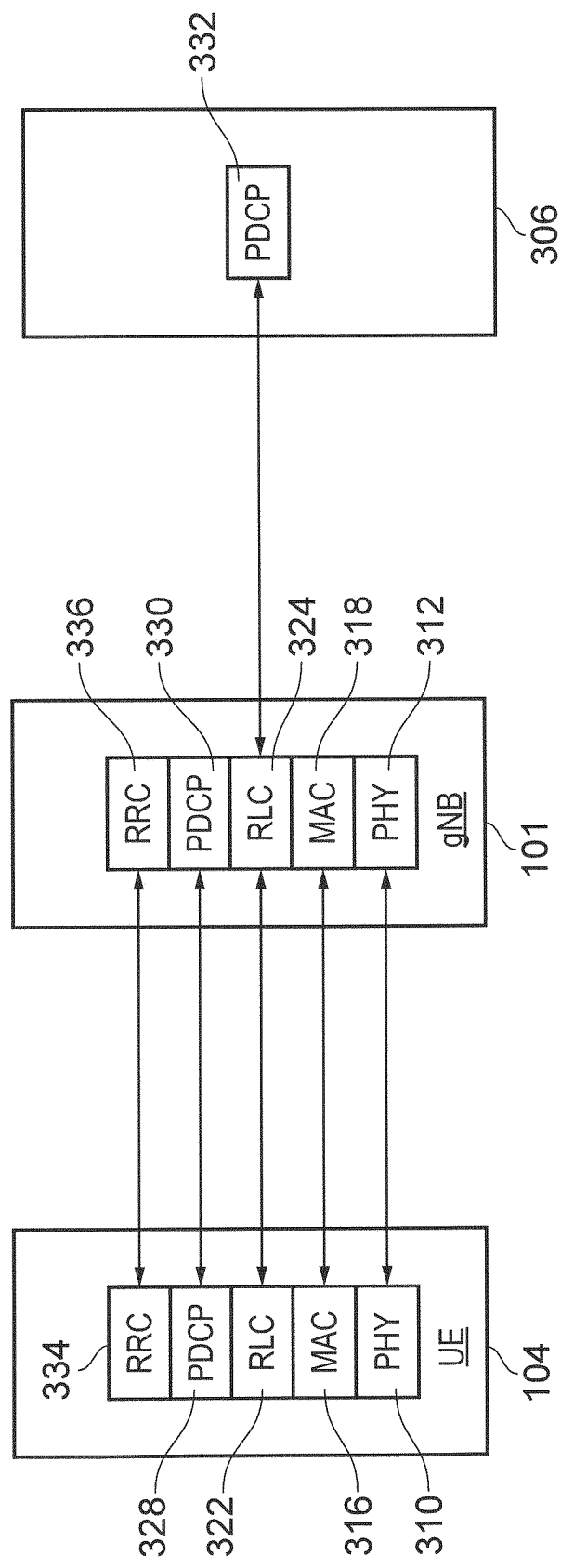
FIG. 3 is a schematic block diagram representing a protocol stack within the terminal device, the infrastructure equipment and the location server according to one example embodiment of the present technique.

As shown in FIG. 3 a typical protocol stack is shown for each of the UE 101, the gNodeB 104, and the location server 306. In accordance with a known arrangement a lowest physical layer provides the physical resources to communicate information received from a medium excess control layer 316, 318, 320. As according to the conventional arrangement in which a radio network is used to communicate information, a radio link control layer 322 and 324 is provided for controlling the radio medium via the medium access control layer 318 316 320. As it will be appreciated because the location server 306 does not form part of the radio network, this does not include a radio link control layer.

Each of the UE, the gNode B and the location server 310 312 306, includes packet data convergence protocol (PDCP) layer 328, 330, 332 which is configured to form the data for transmission into packets as service data units (SDUs) for transmission via the other communications protocol layers. As shown in FIG. 3 at a highest layer there is a radio resource control (RRC) layer 334, 336 within the UE and the gNodeB but not correspondingly in the location server 306.

Figure 4:
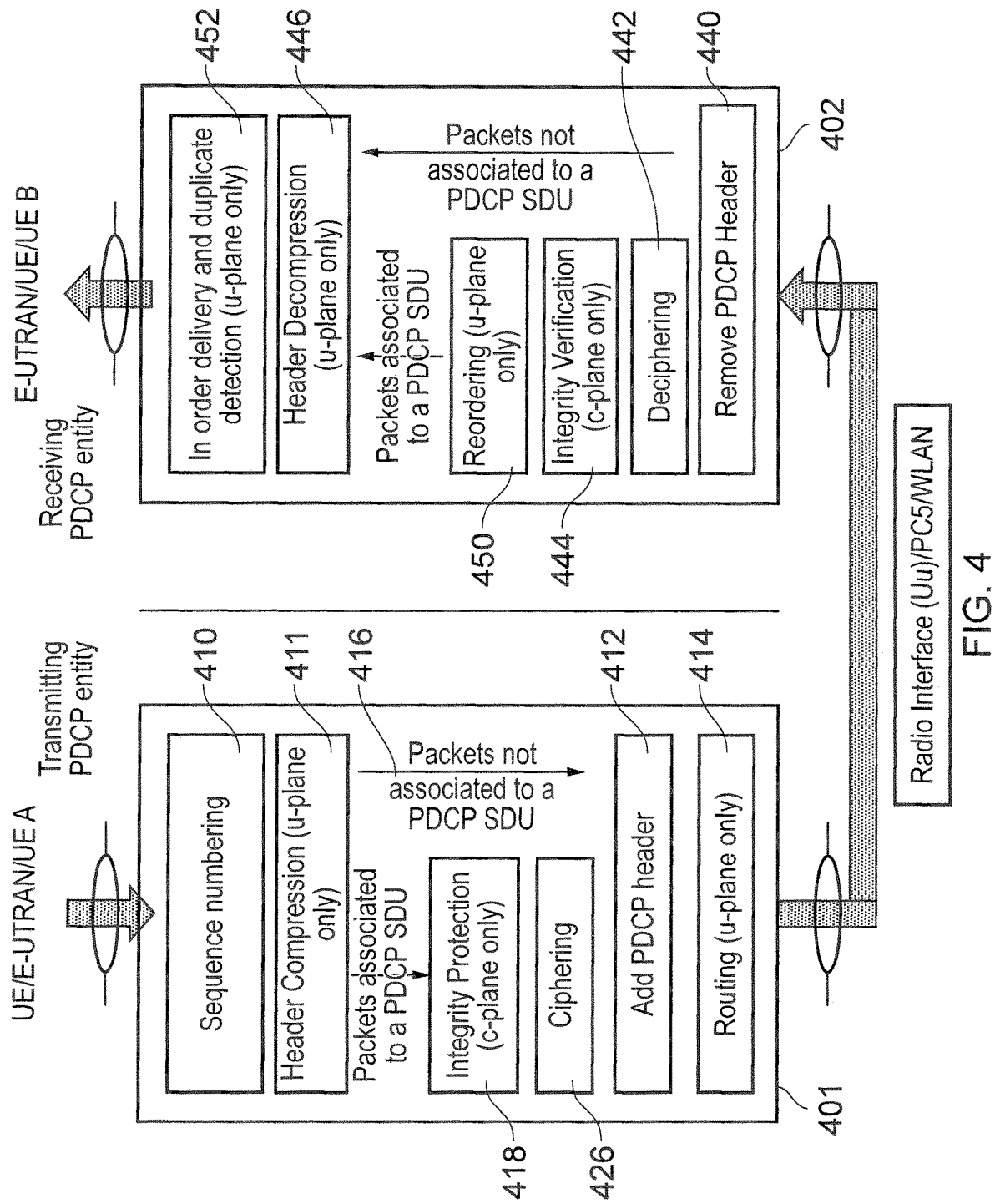
FIG. 4 is a schematic block diagram of an example of functional blocks which form a Packet Data Convergence Protocol (PDCP) entity within a transmitter and a receiver forming part of the PDCP layer of the terminal device, the infrastructure equipment and the location server shown in FIG. 3.

As explained above, in some embodiments of the present technique encryption of the position assistance information for communication to the UE from the network via the SIBs is performed at the PDCP layer which includes a form of ciphering. A typical arrangement of the PDCP layer is shown in FIG. 4. FIG. 4 provides a general block diagram corresponding to the communication of user plane data and control plane data. According to the diagram shown in FIG. 4, data is communicated from a transmitting entity 401 and a receiving entity 402. On the transmitting side 401 data received as user plane data is received by a sequence numbering block 410 which adds a sequence number which is then fed to a Header Compression block 411 in which the header of the received user plane data is compressed. User plane data as shown is then fed to an Add PDCP header block 412 and a routing block 414 which is routed to the corresponding receiving PDCP entity 402. This is represented by an arrow 416 which shows that the packets not associated to a PDCP SDU are processed in accordance with the user plane transmission. The control plane data packets which are associated with an SDU are processed by adding or encoding the data to provide integrity protection in an integrity protection block 418 and are then ciphered using a cipher block 420 before a PDCP header is added in block 412.

Correspondingly on the receiving side the received SDUs are fed to a PDCP header removal block 440 before being deciphered by deciphering block 442. An integrity verification block 444 is then used to verify the integrity of the control plane data. Packets (PDUs) which are not associated with a PDCP SDU are sent to the header decompression block 446. A reordering block 450 reorders the data if the data carried is user plane data. A final block 452 is used to test the order and deliver of the user plane data to a higher layer entity.

As shown in FIG. 4 a ciphering block 420 on the transmitter side 401 and a deciphering block 442 on the receiving side provides a facility for encrypting data. According to the present technique therefore the position assistance information transmitted by the SDU from the PDCP entity within the network is transmitted to the UE by the PDCP layer. Within the PDCP layer the position assistance information is encrypted for transmission in one or more system information blocks. As shown therefore in FIG. 3, the PDCP entity in the location server 306 can transmit an SDU containing the encrypted position assistance information to the gNodeB 101 and which is then transmitted from the PDCP layer of the gNodeB to the UE via the system information block.

With regard to the example shown in FIG. 4, an adaptation can be made to the effect that a modified PDCP PDU header can be attached to RRC PDU, whereby RRC PDU contains a positioning SIB. According to this arrangement a Robust Header Compression (ROHC) is not needed. A PDCP system number (SN) is needed to ensure count value and SN could be smaller than a current value.

Figure 5:
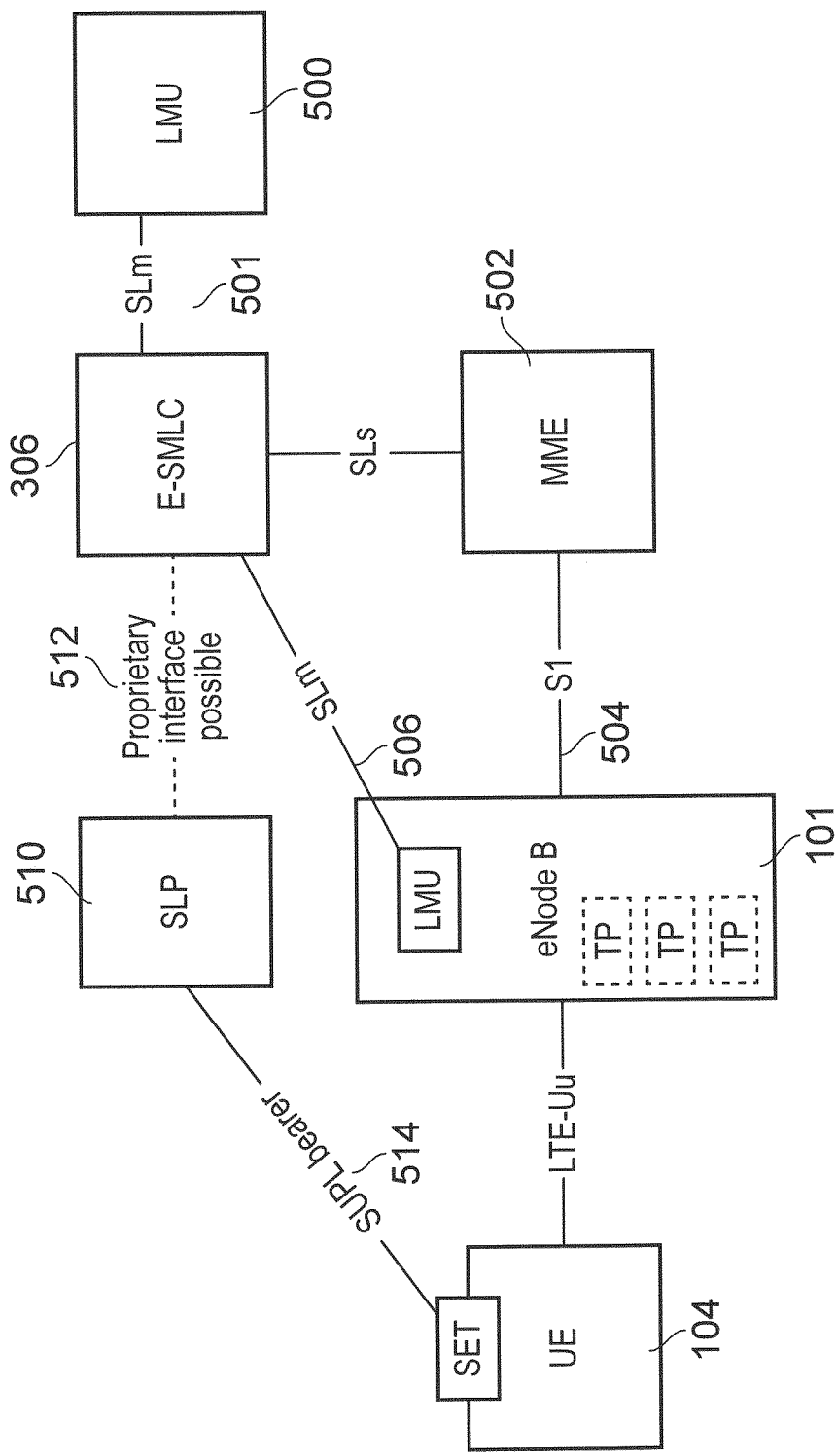
FIG. 5 is a schematic block diagram of parts of the wireless communications system shown in FIG. 1 associated with providing location services to a communications device.

FIG. 5 provides a schematic block diagram of elements of a mobile radio network corresponding to those shown in FIGS. 2, 3 and 4 in which the position information is communicated to the UE in encrypted form. As shown in FIG. 5 in one example the location server 306 is an enhanced location server (eSMLC) which interfaces with an LMU 500 via an SLm interface 501. A mobility management entity 502 interfaces with eSMLC 306 via an SLs interface and to the gNode B 101 via an S1 interface 504. The eSMLC 306 also interfaces with the gNode B 101 via an SLm interface 506. The eSMLC also interfaces with an SLP 510 via a proprietary interface 512 and to the UE via an SUPL bearer 514.

According to the present technique ciphering of the position assistance information is performed within the eSMLC which is then deciphered at the UE in which the UE 104 use the PDCP layer to communicate the position assistance information which is encrypted and transported as system information blocks. Communicating the position assistance information as packets via the PDCP layer also provides an inherent local authentication procedure using a count value of the data transmitted. Accordingly the count value can be used to check that the position information data has been correctly received at the UE.

One problem with communicating position assistance information to UEs is that the position assistance information may be tampered with, for example by a malicious attacker inserting packets mid-way by either a malicious base station or any other entity. Conventionally RRC messages are exchanged in a connected mode, in which the packets are integrity protected in order to avoid replay and for example where position assistance information is sensitive for applications like Vehicle communication, industrial automation etc. According to some example embodiments a counter check procedure can be introduced to improve the integrity protection and provide some level of anti-tampering. This is in contrast to a current counter check procedure which is run for ciphering only and only for dedicated radio bearers (DRBs) and not for integrity protection. Integrity protection is enabled only for RRC signaling in LTE.

It is also envisioned that encryption is performed with a pre-shared key and this key is updated regularly in order to ensure that position assistance information can be updated. Based on this information the UE can log a number of packets received with each key or for a duration when the key is valid and then report this back to the network. According to one example, the UE can report periodically or once connected to the network or once it found a missing sequence number (non-consecutive sequence number). The wireless communications network can ensure at a later stage if there was some attempt to break the security. An indication that an attempt to break security was made can be reported to the location server (SMLC) directly using an LPP protocol. This proposed change does not depend on a PDCP entity being involved. However if there is a PDCP entity, then this entity can be used to report the indication that there has been an attempt to break the security.

Figure 6:
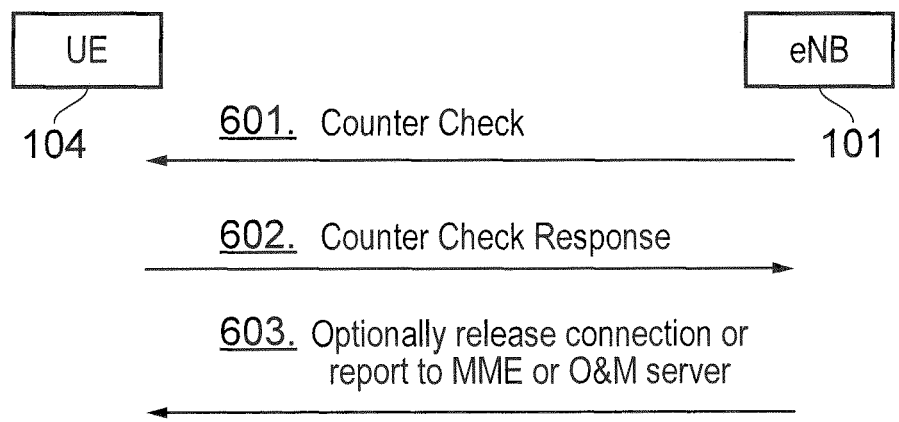
FIG. 6 is an example of a message exchange diagram in which a counter value of data items conveying position assistance information is queried to check an integrity of the position assistance information according to an example embodiment of the present technique.

FIG. 6 provides an example embodiment of the counter check procedure in accordance with the present technique. According to this counter check procedure an amount of data sent in each packet data unit is periodically checked by the gNodeB and the UE for both up and downlink communications. In accordance with embodiments of the present technique however the units of data of the position assistance information for each of the plurality of different position information levels are given a number representing a count of a sequential order of the position information transmitted from the gNodeB to the UE 104. The counter value can be for example included within the PDCP layer when this is processed within the gNodeB 101 and UE 104. As shown in FIG. 6 a counter procedure check can triggered by the gNodeB 101.

In some examples, the counter check procedure could be triggered by the location server (SMLC) or via the gNode B itself. Furthermore the network entity which is communicating the position information from the PDCP entity within that network entity can trigger information concerning the counter check procedure. A network entity having an LPP entity that is to say no PDCP entity can also trigger the counter check procedure.

As shown in FIG. 6 in the example in which the gNodeB 101 triggers the counter check procedure, the gNodeB sends a counter check message 601 to the UE 104. In response the UE sends the counter check response message 602 in which it provides an indication of the count of the position information item to the gNodeB 101. FIG. 6 is therefore an example of performing counter check procedure in RRC_CONNECTED mode. According to this counter check procedure a UE cannot send an uplink RRC message in IDLE mode. The gNodeB 101 then performs a counter check by comparing a count value for data communicated for the position information item to the UE 104 and yet this does not satisfy the counter check in that the count value of the number of data items for the position information item does not agree with that transmitted from the gNode B 101 then the gNode B 101 can transmit a connection release or report to the MME or the Operations and Maintenance centre that the counter check procedure has failed.

In one example a location server performs a counter check procedure. According to this example the location server maintains PDCP COUNT like mechanism, in which packet data units formed within a packet data protocol convergence entity within the wireless communications network, for example within the gNodeB 101, are used to carry the position assistance information. According to this example, if a UE has identified one of the different position assistance information, for example providing an accuracy at level two, then the count value for this will be different to a UE receiving level five information. According to one examples, a counter value is maintained per SIB or per level of information.

According to some example embodiments a PDCP entity in the eNB/gNB or at a centralized location is configured to perform the counter check or similar procedure. According to this arrangement a counter procedure is applied for each level of position assistance information. According to one example the counter check is initiated per SIB type including different encryption level rather than at the radio bearer.

In other examples, rather than the counter number of data items representing the position assistance information being monitored at the PDCP layer, the counter number of data items is maintained and monitored at the application layer.

According to some embodiments of the present technique can provide an arrangement in which a terminal device is configured to generate an estimate of a position of the terminal device. The terminal device detects position assistance information transmitted from the infrastructure equipment, the position assistance information providing information which can be used to assist in determining the position of terminal device with a different level of accuracy, and the assistance information being transmitted as a number of encrypted data units. The terminal device detects that one or more to the number of the data units cannot be decrypted, and transmits an indication to the infrastructure equipment of the one or more of the data units which cannot be decrypted. According to this embodiment some packet data units may be missing in the UE and the UE reports missing packets to the network. These missing packets could be missing because they could not be decrypted. So far our assumption has been that the header part is not encrypted and a counter value is maintained. However, the whole PDU can be encrypted including the header part and in this case UE may not be able to decrypt a malicious packet. Then UE can only report the number of decryption failure packets to the network.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Various further aspects and features of the present technique are defined in the appended claims Various embodiments of the present technique are defined by the following numbered clauses:

Clause 1. A terminal device for use in a wireless telecommunications network, the terminal device comprising: wireless communications receiver circuitry configured to receive signals from the infrastructure equipment via a wireless access interface provided by the infrastructure equipment, position detection receiver circuitry configured to receive a radio signal from which measurements can be used to assist in determining a position of the terminal device, and controller circuitry configured to control the wireless communications receiver circuitry to detect one or more system information blocks carrying a plurality of different position assistance information transmitted from the infrastructure equipment, each of the plurality of different position assistance information providing information which can be used to assist in determining the position of terminal device with a different level of accuracy, and one or more of the plurality of the different assistance information are encrypted, and one of the plurality of different position assistance information is unencrypted, the unencrypted position assistance information providing position assistance information for determining the position of the terminal device with the least accuracy compared with the one or more others of the plurality of different position assistance information, to identify one of the plurality of different position assistance information for use by the terminal device to identify a position of the terminal device, and to estimate the position of the terminal device by combining the identified position assistance information with the radio signal received by the position detection receiver circuitry, wherein the position assistance information is identified in accordance with a permission allocated to the terminal device.

Clause 2. A terminal device according to Clause 1, wherein the unencrypted position assistance information includes an indication that the other ones of the plurality of different position assistance information are encrypted.

Clause 3. A terminal device according to Clause 1 or 2, wherein one of the plurality of different position assistance information is unencrypted, the unencrypted position assistance information includes an indication that the others of the plurality of different position assistance information are encrypted.

Clause 4. A terminal device according to Clause 3, wherein the unencrypted position assistance information includes an indication of whether the other ones of the plurality of difference position assistance information are encrypted with the same encryption key or a different encryption key for each of the different position assistance information.

Clause 5. A terminal device according to any of Clauses 1 to 4, wherein the plurality of different position assistance information is carried by the one or more system information blocks as a radio resource control layer encoded packet data unit.

Clause 6. A terminal device according to Clause 5, wherein the controller circuitry is configured to receive the one or more system information blocks carrying the plurality of different assistance information as the radio resource control layer encoded packet data unit, to decode the encoded packet data unit in accordance with a radio resource layer and to decrypt one or more of the encrypted position assistance information as a packet data convergence protocol layer.

Clause 7. A terminal device according to Clause 6, wherein each of the plurality of different position assistance information are carried in a different system information block, the position assistance information carried in the plurality of system information blocks each being encrypted differently.

Clause 8. A terminal device according to any of Clauses 1 to 7, comprising transmitter circuitry configured to transmit signals to the infrastructure equipment of the wireless communications network, wherein the controller circuitry is configured in combination with the wireless receiver circuitry and the wireless transmitter circuitry to transmit data to or receive data from the infrastructure equipment when in an active mode and not to transmit data or to receive data when the terminal device is in an idle mode, and when in the idle mode to detect the one or more system information blocks carrying the one or more system information blocks carrying the plurality of different position assistance information transmitted from the infrastructure equipment.

Clause 9. A terminal device according to any of Clauses 1 to 8, wherein each of the plurality of different position assistance information comprises a sequence of data items which are received sequentially, and each of the data items of the sequence includes a counter number corresponding to a sequential number of the order of the data units from which the data units were transmitted, and the controller circuitry is configured in combination with the transmitter circuitry to transmit an indication to the infrastructure equipment that one of the data items has been detected with a counter number which does not change in sequence in accordance with a sequential order of reception.

Clause 10. A terminal device according to Clause 9, wherein the controller circuitry is configured in combination with the transmitter circuitry and the receiver circuitry to respond to a request message received from the infrastructure equipment by transmitting the indication to the infrastructure equipment that one of the packet data units has been detected with a counter number which does not change in sequence in accordance with a sequential order of the received data items.

Clause 11. A terminal device according to any of Clauses 1 to 10, wherein the controller circuitry is configured to form a packet data convergence protocol layer and to receive the identified position assistance information at the packet data convergence protocol layer as one or more packet data units, each of the packet data units including a counter number corresponding to a sequential number of the order of the packet data units in which the packet data units were transmitted from a packet data convergence layer entity formed within the wireless communications network which transmitted the packet data units, and the controller circuitry is configured in combination with the transmitter circuitry to transmit an indication to the infrastructure equipment that one of the packet data units has been detected with a counter number which does not change in sequence in accordance with a sequential order of reception.

Clause 12. A terminal device according to Clause 11, wherein the controller circuitry is configured in combination with the transmitter circuitry and the receiver circuitry to respond to a request message received from the infrastructure equipment by transmitting the indication to the infrastructure equipment that one of the data items has been detected with a counter number which does not change in sequence in accordance with a sequential order of the received packet data units.

Clause 13. A terminal device according to any of Clauses 1 to 12, wherein the plurality of different position assistance information are carried in a plurality of system information blocks, each of the plurality of different position assistance information being carried in a different system information blocks, and each system information block including a counter number corresponding to a sequential number of the order in which the position assistance information block was transmitted from the infrastructure equipment, and the controller circuitry is configured in combination with the transmitter circuitry to transmit an indication to the infrastructure equipment that one of the system information blocks has been detected with a counter number which does not change in sequence in accordance with a sequential order.

Clause 14. A terminal device according to Clause 13, wherein the controller circuitry is configured in combination with the transmitter circuitry and the receiver circuitry to respond to a request message received from the infrastructure equipment by transmitting the indication to the infrastructure equipment that one of the system information blocks has been detected with a counter number which does not change in sequence in accordance with a sequential order of the received system information blocks.

Clause 15. A terminal device according to any of Clauses 9 to 14, wherein the controller circuitry is configured in combination with the transmitter circuitry and the receiver circuitry to receive in response to transmitting the counter number an instruction to reacquire the identified position assistance information.

Clause 16. A method by a terminal device of generating an estimate of a position of the terminal device, the method comprising: detecting one or more system information blocks carrying a plurality of different position assistance information transmitted from an infrastructure equipment of a wireless communications network, each of the plurality of different position assistance information providing information which can be used to assist in determining the position of terminal device with a different level of accuracy, and one or more of the plurality of the different assistance information being encrypted, identifying one of the position assistance information for use by the terminal device to identify a position of the terminal device, and estimating the position of the terminal device by combining the identified position assistance information with the radio signal received by the position detection receiver circuitry, wherein the position assistance information is identified in accordance with a permission allocated to the terminal device, wherein one of the plurality of different position assistance information is unencrypted, the unencrypted position assistance information providing assistance information for determining the position of the terminal device with the least accuracy compared with the others of the plurality of different position assistance information.

Clause 17. A method according to Clause 16, wherein the unencrypted position assistance information includes an indication that the other ones of the plurality of different position assistance information are encrypted.

Clause 18. A method according to Clause 16, wherein one of the plurality of different position assistance information is unencrypted, the unencrypted position assistance information includes an indication that the others of the plurality of different position assistance information are encrypted.

Clause 19. A method according to Clause 18, wherein the unencrypted position assistance information includes an indication of whether the other ones of the plurality of difference position assistance information are encrypted with the same encryption key or a different encryption key for each of the different position assistance information.

Clause 20. A terminal device for use in a wireless telecommunications network, the terminal device comprising wireless communications receiver circuitry configured to receive signals from the infrastructure equipment via a wireless access interface provided by the infrastructure equipment, position detection receiver circuitry configured to receive a radio signal from which measurements can be used to assist in determining a position of the terminal device, transmitter circuitry configured to transmit signals to the infrastructure equipment of the wireless communications network, and controller circuitry configured to control the wireless communications receiver circuitry to detect position assistance information transmitted from the infrastructure equipment, the position assistance information providing information which can be used to assist in determining the position of terminal device with a different level of accuracy, and the different assistance information being transmitted as a number of data units, each of the data units including a counter number corresponding to a sequential number of the order of the data units in which the data units were transmitted, and the controller circuitry is configured in combination with the transmitter circuitry to transmit an indication to the infrastructure equipment that one of the data units has been detected with a counter number which does not change in sequence in accordance with a sequential order of reception.

Clause 21. A terminal device according to Clause 20, wherein the controller circuitry is configured to form a packet data convergence protocol layer and to receive the position assistance information at the packet data convergence protocol layer as one or more data units, each of the data units including the counter number corresponding to the sequential number of the order of the packet data units in which the packet data units were transmitted from the data convergence layer entity formed within the wireless communications network which transmitted the data units.

Clause 22. A terminal device according to Clause 21, wherein the data units are packet data units formed by a radio resource control entity or system information blocks.

Clause 23. A method by a terminal device of generating an estimate of a position of the terminal device, the method comprising detecting position assistance information transmitted from the infrastructure equipment, the position assistance information providing information which can be used to assist in determining the position of terminal device with a different level of accuracy, and the different assistance information being transmitted as a number of data units, each of the data units including a counter number corresponding to a sequential number of the order of the data units in which the data units were transmitted, transmitting an indication to the infrastructure equipment that one of the data units has been detected with a counter number which does not change in sequence in accordance with a sequential order of reception.

Clause 24. A method according to Clause 23, wherein the position assistance information is one of a plurality of different position assistance information, one or more of which has been encrypted and one of which is unencrypted, the unencrypted position assistance information providing position assistance information for determining the position of the terminal device with the least accuracy compared with the one or more others of the plurality of different position assistance information, the method comprising identifying one of the plurality of different position assistance information for use by the terminal device to identify a position of the terminal device, and estimating the position of the terminal device by combining the identified position assistance information with the radio signal received by the position detection receiver circuitry, wherein the position assistance information is identified in accordance with a permission allocated to the terminal device.

Clause 25. A method by a terminal device of generating an estimate of a position of the terminal device, the method comprising detecting position assistance information transmitted from the infrastructure equipment, the position assistance information providing information which can be used to assist in determining the position of terminal device with a different level of accuracy, and the assistance information being transmitted as a number of encrypted data units, detecting that one or more to the number of the data units cannot be decrypted, transmitting an indication to the infrastructure equipment of the one or more of the data units which cannot be decrypted.

REFERENCES

[1] http://www.3gpp.org/DynaReport/36-series.htm
[2] http://www.3gpp.org/DynaReport/38-series.htm
[3] 3GPP TS 36.305: "Stage 2 functional specification of User Equipment (UE) positioning in E-UTRAN".
[4] 3GPP TS 36.355: "Evolved Universal Terrestrial Radio Access (E-UTRA); LTE Positioning Protocol (LPP)"
[5] 3GPP TS 23.271: "Functional stage 2 description of Location Services (LCS)".
[6] OMA Secure User Plane Location (SUPL)
[7] EP17199204

The invention claimed is:

1. A terminal device for use in a wireless telecommunications network, the terminal device comprising:
 wireless communications receiver circuitry configured to receive signals from the infrastructure equipment via a wireless access interface provided by the infrastructure equipment,
 position detection receiver circuitry configured to receive a radio signal from which measurements can be used to assist in determining a position of the terminal device, and
 controller circuitry configured to
 control the wireless communications receiver circuitry to detect one or more system information blocks carrying a plurality of different position assistance information transmitted from the infrastructure equipment, each of the plurality of different position assistance information providing information which can be used to assist in determining the position of terminal device with a different level of accuracy, and one or more of the plurality of the different assistance information are encrypted, and one of the plurality of different position assistance information is unencrypted, the unencrypted position assistance information providing position assistance information for determining the position of the terminal device with the least accuracy compared with the one or more others of the plurality of different position assistance information,
 identify one of the plurality of different position assistance information for use by the terminal device to identify a position of the terminal device,
 estimate the position of the terminal device by combining the identified position assistance information with the radio signal received by the position detection receiver circuitry, wherein the position assistance information is identified in accordance with a permission allocated to the terminal device,
 form a packet data convergence protocol layer,
 receive the identified position assistance information at the packet data convergence protocol layer as one or more packet data units, each of the packet data units including a counter number corresponding to a sequential number of the order the packet data units were transmitted from a packet data convergence layer entity formed within the wireless communications network which transmitted the packet data units,
 send a message to the infrastructure equipment indicating the counter number of a type of position assistance information currently being used by the UE,
 receive a counter check from the infrastructure equipment,
 perform a counter check response, wherein the counter check response transmits an indication to the infrastructure equipment of a counter number of that one of the packet data units of the type of position assistance currently being used, and
 in response to a determination at the infrastructure equipment that the counter number of the one of the packet data unit included in the counter check does not match with the counter number of the received packet data units, receive a connection release from the infrastructure equipment.

2. The terminal device according to claim 1, wherein the unencrypted position assistance information includes an indication that the other ones of the plurality of different position assistance information are encrypted.

3. The terminal device according to claim 1, wherein one of the plurality of different position assistance information is unencrypted, the unencrypted position assistance information includes an indication that the others of the plurality of different position assistance information are encrypted.

4. The terminal device according to claim 3, wherein the unencrypted position assistance information includes an indication of whether the other ones of the plurality of difference position assistance information are encrypted with the same encryption key or a different encryption key for each of the different position assistance information.

5. The terminal device according to claim 1, wherein the plurality of different position assistance information is carried by the one or more system information blocks as a radio resource control layer encoded packet data unit.

6. The terminal device according to claim 5, wherein the controller circuitry is configured to receive the one or more system information blocks carrying the plurality of different assistance information as the radio resource control layer encoded packet data unit, to decode the encoded packet data unit in accordance with a radio resource layer and to decrypt one or more of the encrypted position assistance information as a packet data convergence protocol layer.

7. The terminal device according to claim 6, wherein each of the plurality of different position assistance information are carried in a different system information block, the position assistance information carried in the plurality of system information blocks each being encrypted differently.

8. The terminal device according to claim 1, comprising transmitter circuitry configured to transmit signals to the infrastructure equipment of the wireless communications network, wherein the controller circuitry is configured in combination with the wireless receiver circuitry and the wireless transmitter circuitry to transmit data to or receive data from the infrastructure equipment when in an active mode and not to transmit data or to receive data when the terminal device is in an idle mode, and when in the idle mode to detect the one or more system information blocks carrying the one or more system information blocks carrying the plurality of different position assistance information transmitted from the infrastructure equipment.

9. The terminal device according to claim 1, wherein each of the plurality of different position assistance information comprises a sequence of data items which are received sequentially, and each of the data items of the sequence includes a counter number corresponding to a sequential number of the order of the data units from which the data units were transmitted, and the controller circuitry is configured in combination with the transmitter circuitry to transmit an indication to the infrastructure equipment that one of the data items has been detected with a counter number which does not change in sequence in accordance with a sequential order of reception.

10. The terminal device as claimed in claim 9, wherein the controller circuitry is configured in combination with the transmitter circuitry and the receiver circuitry to respond to a request message received from the infrastructure equipment by transmitting the indication to the infrastructure equipment that one of the packet data units has been detected with a counter number which does not change in sequence in accordance with a sequential order of the received data items.

11. The terminal device as claimed in claim 1, wherein the controller circuitry is configured in combination with the transmitter circuitry and the receiver circuitry to respond to a request message received from the infrastructure equipment by transmitting the indication to the infrastructure equipment that one of the data items has been detected with a counter number which does not change in sequence in accordance with a sequential order of the received packet data units.

12. The terminal device according to claim 1, wherein the plurality of different position assistance information are carried in a plurality of system information blocks, each of the plurality of different position assistance information being carried in a different system information blocks, and each system information block including a counter number corresponding to a sequential number of the order in which the position assistance information block was transmitted from the infrastructure equipment, and the controller circuitry is configured in combination with the transmitter circuitry to transmit an indication to the infrastructure equipment that one of the system information blocks has been detected with a counter number which does not change in sequence in accordance with a sequential order.

13. The terminal device as claimed in claim 12, wherein the controller circuitry is configured in combination with the transmitter circuitry and the receiver circuitry to respond to a request message received from the infrastructure equipment by transmitting the indication to the infrastructure equipment that one of the system information blocks has been detected with a counter number which does not change in sequence in accordance with a sequential order of the received system information blocks.

14. The terminal device according to claim 9, wherein the controller circuitry is configured in combination with the transmitter circuitry and the receiver circuitry to receive in response to transmitting the counter number an instruction to reacquire the identified position assistance information.

15. A method by a terminal device of generating an estimate of a position of the terminal device, the method comprising detecting one or more system information blocks carrying a plurality of different position assistance information transmitted from an infrastructure equipment of a wireless communications network, each of the plurality of different position assistance information providing information which can be used to assist in determining the position of terminal device with a different level of accuracy, and one or more of the plurality of the different assistance information being encrypted, identifying one of the position assistance information for use by the terminal device to identify a position of the terminal device, estimating the position of the terminal device by combining the identified position assistance information with the radio signal received by the position detection receiver circuitry, wherein the position assistance information is identified in accordance with a permission allocated to the terminal device, wherein one of the plurality of different position assistance information is unencrypted, the unencrypted position assistance information providing assistance information for determining the position of the terminal device with the least accuracy compared with the others of the plurality of different position assistance information;

forming a packet data convergence protocol layer, receiving the identified position assistance information at the packet data convergence protocol layer as one or more packet data units, each of the packet data units including a counter number corresponding to a sequential number of the order the packet data units were transmitted from a packet data convergence layer entity formed within the wireless communications network which transmitted the packet data units, sending a message to the infrastructure equipment indicating the counter number of a type of position assistance information currently being used by the UE, receiving a counter check from the infrastructure equipment, performing a counter check response, wherein the counter check response transmits an indication to the infrastructure equipment of a counter number of that one of the packet data units of the type of position assistance currently being used, and in response to a determination at the infrastructure equipment that the counter number of the one of the packet data unit included in the counter check does not match with the counter number of the received packet data units, receiving a connection release from the infrastructure equipment.

16. The method according to claim 15, wherein the unencrypted position assistance information includes an indication that the other ones of the plurality of different position assistance information are encrypted.

* * * * *